United States Patent Office 3,796,736
Patented Mar. 12, 1974

3,796,736
ESTER SYNTHESIS FOR PREPARATION OF SYNTHETIC FATS
Lawrence C. Mitchell, Southfield, Mich., Paul Kobetz, Baton Rouge, La., and William Burns, Warren, Mich., assignors to Ethyl Corporation, Richmond, Va.
No Drawing. Filed July 21, 1971, Ser. No. 164,914
Int. Cl. C07c 69/30; C11c 3/00
U.S. Cl. 260—410.7    2 Claims

ABSTRACT OF THE DISCLOSURE

Employment of catalytic quantities of amines such as 2,6-lutidine in the reaction of a carboxylic acid with epihalohydrin, or ester derivative promotes opening of the epoxy ring to form 1-propyl ester with a minimized amount of 2-propyl ester isomer.

BACKGROUND OF THE INVENTION

Addition of carboxylic acids to epichlorohydrin has been studied in several laboratories; Rosowsky, A. Heterocyclic Compounds With Three- and Four-Membered Rings, Part One, A. Weissberger, Editor, Interscience Publishers Inc., New York, N.Y. (1964), pp. 368–9. Also see Carreau, Bull de la Societé Chemique de France, pp. 4104 et seq. (1970). Another publication is Maerker et al., J. Org. Chem. 26, 2681 (1961). Although the reaction is known, we believe the ability of 2,6-lutidine and similar amines to favor opening of the ring to give only a minor amount of 2-propyl ester, has not been previously reported.

SUMMARY OF THE INVENTION

In the addition of carboxylic acids to epihalohydrin such as epichlorohydrin or ester derivatives, the improvement comprising conducting the process in the presence of a tertiary amine such as 2,6-lutidine whereby formation of 1-propyl ester is favored over 2-propyl ester isomer.

In an important aspect, this invention pertains to process for the preparation of 3-halo-2-hydroxy-1-propyl alkanoate with a minimized amount of 3-halo-1-hydroxy-2-propyl alkanoate isomer, said process comprising reacting an epoxy-compound with a carboxylic acid in the presence of a tertiary amine catalyst, (a) said epoxy-compound having the formula

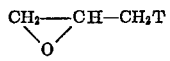

wherein T is selected from chlorine and bromine,
(b) said carboxylic acid has the formula R—COOH wherein R is a fatty acid radical of up to about 26 carbon atoms, and
(c) said tertiary amine has the formula

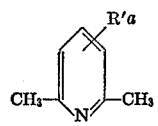

wherein R' is an alkyl radical of from 1 to about 3 carbons and $a$ is an integer having a value of zero or 1.

DESCRIPTION OF PREFERRED EMBODIMENTS

This invention can be depicted by the following equation

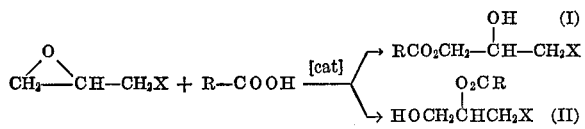

For the epihalohydrin, epichlorohydrin and epibromohydrin can be employed. The chloro compound is more readily available, and for this reason, its use is preferred.

In the carboxylic acid, the structure of the radical R is not critical so long as it is stable under the reaction conditions employed, does not contain groups which hinder or retard the process by undergoing competing side reactions, or not so bulky as to unduly delay the process because of steric hindrance. Because this invention is directed to formation of intermediates useful in preparing synthetic fats, it is preferred that R be alkyl. More preferably it is a straight chain, and most preferably it has from about 2 to about 26 carbon atoms. It is to be understood that formic acid and acids of 27 or more carbons can be used. Many useful synthetic fat intermediates are prepared from alkanoic acids of from about 12 to about 18 carbon atoms.

The catalyst employed is a tertiary amine such as 2,6-lutidine. Other hindered amines can also be employed. The amine function should not be so hindered as to disallow or retard proton interaction. Typical amines suggested by 2,6-lutidine are those having the formula

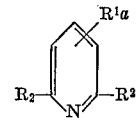

wherein the $R^2$ radicals are independently selected from alkyl radicals of up to about three carbon atoms, $a$ is an integer of value zero to 3, and $R^1$ is an inert radical. For reasons of availability and cost it is preferred that each $R^2$ be methyl and $R^1$ have up to about three carbons. Compounds designated when $a$ is zero or 1 are more readily available and are preferred for this reason. Likewise, economic reasons make preferable those "$a=1$" compounds where R is at the position para to the ring nitrogen.

Although the equation above indicates the reactants combine in a molar ratio of 1:1, it is not necessary to conduct the process using equimolar amounts of reactants. From 3–4 moles of epihalohydrin per each mole of acid yields good results, but it is not necessary to use this range. Thus up to 5, 6, 10 or more moles of epihalohydrin can be used per mole of acid, if desired. Likewise, less than 3 moles per mole of acid can be employed. An excess of acid can be used but in some instances diesterification may result. Accordingly, where it is desirable to keep diesterification to a minimum, less than stoichiometric amounts of epichlorohydrin are not desired. Thus, a preferred range would be from about 1 to 10 or more moles of epihalohydrin per mole of acid, a more preferred range being from about 2.5 to about 7.5 moles per mole of acid.

Sufficient amine catalyst is employed to effect increase in the amount of isomer (I) produced. Good results are obtained when from about 0.02 to 2.0 moles of catalyst are employed per each mole of acid, however greater and lesser amounts can be used if desired. A more preferred range is from about 0.05 to about 1 mole per each mole of acid.

The process temperature is not critical and any convenient temperature which affords a reasonable rate of reaction can be efficaciously employed. The reaction proceeds at ambient temperature, in general, elevated temperatures tend to shorten the reaction time. In some instances, higher temperatures tend to increase formation of isomer II. A preferred temperature range is from ambient to the boiling point of the halohydrin. In general, preferred, temperatures are from 30–100° C. With epichlorohydrin more preferred temperatures are from about 50° to about 85° C.

The process proceeds well at ambient or normal pressures; thus it is not necessary to lower or raise the pressure. Although the pressure is not critical, superatmospheric and subatmospheric pressures can be used if desired. If desired, an inert gas atmosphere can be used. Suitable inert gases are nitrogen, argon, neon and the like. Use of an inert atmosphere is not critical.

The reaction time is not critical. It is only necessary to contact the reaction ingredients such that reaction takes place. This can be determined readily from minimum experience. The time is usually shortened with elevated temperature. In general times of from ½ to 50 hours are sufficient.

EXAMPLE I

A three necked, round bottom flask was charged with 320 millimoles of epichlorohydrin and 90 millimoles of stearic acid. The flask was equipped with a thermometer, magnetic stirrer, reflux condenser and nitrogen blanket. The mixture was heated just below 82° C., and then 2,6-lutidine (10 millimoles) was added. The resultant mixture was then held at 82° C. for 1.25 hours. Analysis by VPC showed a 90% conversion (based on amount of acid) and that the product contained a mixture of 97% isomer (I), i.e. 3-chloro-2-hydroxy-1-propyl stearate, and 3% isomer (II), i.e., 3-chloro-1-hydroxy-2-propyl stearate.

EXAMPLE II

In a similar manner, 130 millimoles of epichlorohydrin, 36 millimoles of stearic acid, and 4 millimoles of 2,6-lutidine were contacted at 81° for 1.5 hours. Analysis by VPC indicated the same product esters in the same ratio were obtained.

The reaction mixture was worked up as follows.

The reaction mixture was cooled in the freezer, evacuated while cold and allowed to warm to room temperature under vacuum. After evacuating at 1.0 mm. for three hours, the product still weighed 20.5 g. (from 23.4 g. of starting materials) indicating very little epichlorohydrin was stripped off.

The product was dissolved in hexane at room temperature and recrystallized in the freezer. The crystals were filtered off through a pre-cooled coarse sintered glass funnel, washed several times with cold hexane and dried in an evacuated desiccator, wt. 12.2 g. (90% yield). VPC analysis showed it contained about 4% isomer II. From the mother liquor was isolated 0.5 g. of product containing about 9% isomer II.

The product was recrystallized from cold hexane again, but there was no improvement in isomer distribution.

The product was then recrystallized from methanol by dissolving at room temperature and crystallizing in the freezer. The isolation of the solid was very difficult because it readily redissolved on slight warming. The recrystallized material recovered still contained 4% isomer II. One more recrystallization from hexane gave product containing 3% isomer II.

Similar results are obtained when epibromohydrin is employed. Also, similar results are obtainable when the amine, acid and halohydrin are added together; thus it is not critical to use the mode of addition employed in the above examples. Using the method employed above, acetic, propionic, n-butyric, caproic, caprylic, pelargonic, lauric, myristic, palmitic, arachidic, lignoceric and cerotic acid yield similar results when 1 to 10 moles of epichlorohydrin are used per mole of acid and temperatures of 20 to 85° C. are employed. Reaction of such acids to produce low quantities of isomer (II) is catalyzed by from 0.02 to 2 moles of 2,6-diethylpyridine, 2,6-di-n-propyl pyridine, 3-methyl-2,6-lutidine, 3,4-dimethyl-2,6-lutidine, 3,4,5-trimethyl-2,6-lutidine, 2,4,6-trimethylpyridine, 4-propyl-2,6-diethylpyridine and 4-propyl-2,6-lutidine.

Many of the products made by this invention are known compounds and they have the many utilities known for them. The products produced by this invention are valuable chemical intermediates. The products can be used in the synthesis of synthetic fats and the ability of this process to produce but a low amount of one product isomer is an important feature of this invention.

To prepare synthetic fats, the product of this invention can be subsequently reacted to put two more ester groups on the propyl back bone. If desired, separation of isomers can be conducted before or after the subsequent esterification or esterifications. For fats, one can conduct this process using a mixture of acids of known or indefinite composition to produce a mixture of products that can be changed to a mixture of triglycerides.

The process of this invention can be extended to esterification of derivatives of epihalohydrins. Thus, using reaction conditions and amine catalysts disclosed above, the acids mentioned above can be made to react according to the following equation.

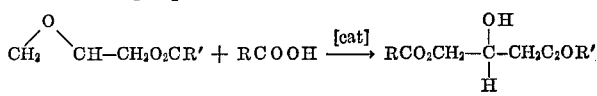

These products, and any isomer analogous to the (II) isomers above, can also be used as chemical intermediates. Illustrative is their use in the preparation of specific fatty acid triglycerides. Thus the hydroxyl group can be esterified, using R″COCl wherein R″ is alike or different from R and R′ and is of the same class of acids as defined above and below. As can be seen, one can form monoacid triglycerides, diacid triglycerides and triacid triglycerides depending on whether R, R′ and R″ are alike or different.

It is to be understood that other acylating agents can be used to esterify the hydroxyl group; in other words the acylation, as appreciated by those skilled in the art, is not limited to use of acyl halides.

The process of this invention for forming triglycerides illustrated by the second equation above and followed by esterification, such as by an acyl halide, is an important aspect of this invention. Since Carreau supra requires a separate ring opening step, the above method offers advantage over Carreau. The process conditions for acylation with RCOCl are not critical. The conditions set forth by Carreau, or other prior art as well as equivalents and extensions recognized as operable by a skilled practitioner can be used if desired.

Further illustration of the use of this invention in preparing specific triglycerides is as follows. The product of the first equation above—with or without separation of isomers (I) and (II)—is reacted to esterify the —OH group (if desired with RCOCl) and this product is reacted with an alkali metal carboxylate, RCOOM, where M is sodium or potassium. The acylation and reaction with carboxylate salt can be conducted as taught by Carreau or other prior art or equivalents or extensions thereof. For purposes of illustrating these techniques, pertinent portions of Carreau supra are incorporated herein by reference as if fully set forth. Again, the conditions employed for acylation or reaction with

are not critical. Thus, the reaction with metal carboxylate need not be conducted as taught by Carreau, but can be carried out in the presence of a dipolar, aprotic solvent such as dimethylsulfoxide and the like.

The methods provided herein for forming triglycerides do not suffer to any appreciable extent by acyl group migation.

As stated above, the structure of the group R in the carboxylic acid reactant is not critical. Aside from alkyl configurations, the group may be unsaturated. Thus one can employ unsaturated acids which are found in natural fats and oils. Such acids as oleic, linoleic and linolenic and others are listed in the table on page 985 of Advanced Organic Chemistry, Fieser and Fieser, Reinhold Publishing Company, New York, N.Y. (1961). That table is incorporated by reference herein as if fully set forth. Thus, using the techniques of the above examples these unsaturated acids can be made to react in a manner as set forth in the equations above.

Likewise, the radical R' in the epoxide depicted in the second equation above may be derived from an unsaturated acid such as those in the table on page 985 of Fieser and Fieser supra. These can be made to react in the manner illustrated by the examples.

For purposes of this invention, radicals depicted by "R" in RCOOH and derived from the aforementioned unsaturated acids and those having the alkyl configuration discussed above are encompassed by the term "fatty acid radical."

As mentioned above, this invention encompasses a reaction sequence in which alkali metal carboxylate is reacted with a halogen-containing reaction intermediate to produce a specific triglyceride, and the alkali metal carboxylate may be reacted in the presence of a dipolar, aprotic solvent. The use of such solvents in this reaction is set forth in a companion application filed in the name of Lawrence C. Mitchell on the same day of this application. It has the title "Ester Synthesis." The contents of that companion application are incorporated by reference herein as if fully set forth. Said companion application has application Ser. No. 164,915 and was filed July 21, 1971.

What is claimed is:

1. Process for preparing a triglyceride, said process comprising reacting an epoxy-compound with a carboxylic acid in the presence of a tertiary amine catalyst
   (a) said epoxy-compound having the formula

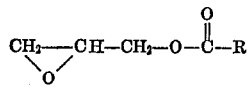

wherein R is as defined below
   (b) said carboxylic acid has the formula R—COOH wherein R is a fatty acid radical of up to about 26 carbon atoms, and
   (c) said tertiary amine has the formula

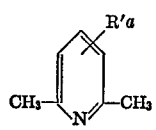

wherein R' is an alkyl radical of from 1 to about 3 carbons and $a$ is an integer having a value of zero or 1,
and subsequently reacting the diester produced with an acylchloride,

wherein R is as hereinabove defined.

2. Process for preparing a triglyceride, said process comprising reacting an epoxy-compound with a carboxylic acid in the presence of a tertiary amine catalyst
   (a) said epoxy-compound having the formula

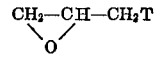

wherein T is selected from chlorine and bromine,
   (b) said carboxylic acid has the formula R—COOH wherein R is a fatty acid radical of up to about 26 carbon atoms, and
   (c) said tertiary amine has the formula

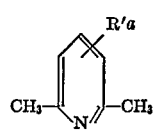

wherein R' is an alkyl redical of from 1 to about 3 carbons and $a$ is an integer having a value of zero or 1,
subsequently reacting the product produced with an acylchloride,

and thereafter reacting the diester thereby produced with a metal carboxylate,

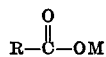

wherein M is sodium or potassium, and R in said acyl halide and metal carboxylate are alike or different and are selected from the class hereinabove defined.

References Cited
UNITED STATES PATENTS

| | | | |
|---|---|---|---|
| 2,335,813 | 11/1943 | Stein | 260—488 |
| 2,523,309 | 9/1950 | Kester | 260—410.7 |
| 3,641,112 | 2/1972 | Ichikawa et al. | 260—475 P |

FOREIGN PATENTS

| | | |
|---|---|---|
| 1,533,647 | 7/1968 | France. |
| 1,590,151 | 5/1970 | France. |

OTHER REFERENCES

Radlove et al.: J. Am. Oil Chemists Soc., vol. 37, 570–1 (1960).

Markley: "Fatty Acids," 2nd ed. pt. 2, Interscience Publishers, Inc., N.Y. (1961), pp. 811–818.

LEWIS GOTTS, Primary Examiner

DIANA G. RIVERS, Assistant Examiner

U.S. Cl. X.R.

260—408, 410.8, 488 J, 491

PO-1050
(5/69)

UNITED STATES PATENT OFFICE
CERTIFICATE OF CORRECTION

Patent No. 3,796,736     Dated March 12, 1974

Inventor(s) Lawrence C. Mitchell et al

It is certified that error appears in the above-identified patent and that said Letters Patent are hereby corrected as shown below:

Column 4, line 17, the equation for the product should read:

$$RCO_2CH_2-\underset{H}{\overset{OH}{\underset{|}{\overset{|}{C}}}}-CH_2O_2CR'$$

Column 4, line 25, the formula should read $$R''COCl$$

Signed and sealed this 2nd day of July 1974.

(SEAL)
Attest:

EDWARD M. FLETCHER, JR.
Attesting Officer

C. MARSHALL DANN
Commissioner of Patents